United States Patent
Bartelheim et al.

(10) Patent No.: US 6,674,363 B2
(45) Date of Patent: Jan. 6, 2004

(54) SYSTEM FOR PHYSICAL LOCATION OF FIELD DEVICES IN PROCESS PLANTS

(75) Inventors: Juergen Bartelheim, Kalletal (DE); Thomas Georg Karte, Lemgo (DE)

(73) Assignee: ABB Patent GmbH, Mannheim (DE)

(*) Notice: Subject to any disclaimer, the term of this patent is extended or adjusted under 35 U.S.C. 154(b) by 0 days.

(21) Appl. No.: 10/142,036

(22) Filed: May 9, 2002

(65) Prior Publication Data

US 2002/0171558 A1 Nov. 21, 2002

(30) Foreign Application Priority Data

May 18, 2001 (DE) .......................... 101 24 266

(51) Int. Cl.[7] .............................. G08B 1/08
(52) U.S. Cl. ................... 340/539.1; 340/539.11; 340/539.13; 340/825.36; 340/825.49; 340/524; 340/525; 340/573.4
(58) Field of Search .......... 340/539.1, 539.11, 340/539.13, 539.15, 539.2, 539.23, 825.36, 825.49, 524, 525, 3.1, 286.07, 573.4

(56) References Cited

U.S. PATENT DOCUMENTS

| | | | | |
|---|---|---|---|---|
| 5,686,902 A | * | 11/1997 | Reis et al. ................ 340/10.2 |
| 5,828,306 A | * | 10/1998 | Curran .................... 340/573.4 |
| 5,960,214 A | * | 9/1999 | Sharpe et al. ................ 710/15 |
| 6,348,860 B1 | * | 2/2002 | Davis et al. ................ 340/525 |
| 6,369,695 B1 | * | 4/2002 | Horon ................... 340/286.01 |
| 6,462,656 B2 | * | 10/2002 | Ulrich et al. ............ 340/539.1 |

* cited by examiner

Primary Examiner—Daryl Pope
(74) Attorney, Agent, or Firm—Michael M. Rickin

(57) ABSTRACT

In order to make it possible to go to and to find a field device in a process plant in the shortest possible time, there is provided a fixed-position device and a mobile device. The fixed-position device is associated with the field device and comprising at least one processing unit, one communication device with an antenna for wire-free communication, and a non-volatile memory. Details relating to the position of the installation location of the field device are stored in the non-volatile memory such that they can be called up. The mobile device is equipped with a processing unit, a keyboard, a display unit for visualizing the details relating to the position of the installation location of the field device and a communication device which corresponds to the communication device in the fixed-position device and has an antenna for wire-free communication.

4 Claims, 2 Drawing Sheets

SYSTEM FOR PHYSICAL LOCATION OF FIELD DEVICES IN PROCESS PLANTS

1. FIELD OF THE INVENTION

The present invention relates to field devices in process plants where each field device can be uniquely identified and is connected to a control system by way of a communication network and more particularly to a system for expeditiously actuating and finding the location of each such unit.

2. DESCRIPTION OF THE PRIOR ART

A large number of field devices are installed in complex and/or physically extended process plants, in order to control the technical process in the process plant. These include measured value sensors for physical variables such as pressure, temperature, flow rate, concentration and the like, as well as actuators for operating valves, flaps, feed means and the like.

In the event of a defect or fault, the faulty field device must be identified and located as quickly as possible, in order to allow it to be repaired locally, or in order to allow the faulty field device to be replaced.

All the field devices in a process plant are included in a hierarchical structure of control loops comprising control devices. The control devices are in this case combined in a control system which is matched to the process plant. The control system can in this case be installed centrally or in a decentralized manner. Independently of this, each field device in a given process plant can be identified uniquely, and can be logically associated with a plant part, via the control system means. The logical location process for each field device that is carried out in this way is, however, inadequate actually to find a faulty field device in the process plant locally, in a reasonable time.

Furthermore, identification systems, for example in accordance with DIN 6779, are known, on the basis of which each field device in a given process plant is identified on the basis of its installation location. However, detailed knowledge of the layout of the process plant is required to find a field device that is being looked for.

The invention is thus based on the object of specifying means which allow a field device in the process plant to be actuated and to be found specifically in the shortest possible time.

SUMMARY OF THE INVENTION

The invention is based on a process plant in which each field device can be identified uniquely and is connected to a control system via a communication network. Furthermore, the process plant has a locally oriented hierarchical structure and a plant identification system based on it.

The essence of the invention comprises a fixed-position device and a mobile device. The fixed-position device is associated with the field device, and is a component which cannot be separated from it. Details relating to the position of the installation location of the field device are stored in the fixed-position device such that they can be called up.

To this end, the fixed-position device comprises at least one processing unit, a programmable non-volatile memory and a communication device for wire-free communication.

The mobile device comprises at least one processing unit, a keyboard, a display unit and a communication device, which corresponds to the communication device in the fixed-position device, for wire-free communication.

When a defect occurs in a field device, an alarm message is sent to the control system via the communication network. Furthermore, the communication device for wire-free communication is activated, and continuously transmits the details relating to the position of the installation location of the field device, on the basis of the specific plant identification.

The position details relating to the faulty field device are received by the communication device for wire-free communication in the mobile device, and are visualized on the display unit.

This makes it possible for the servicing technician who is carrying the mobile device to go to and to find the faulty field device in the process plant specifically in the shortest possible time, without any detailed knowledge of the plant.

DESCRIPTION OF THE DRAWING

The invention will be explained in more detail in the following text with reference to an exemplary embodiment. In the drawings which are required for this purpose.

DESCRIPTION OF THE PREFERRED EMBODIMENT(S)

Figure 1A:
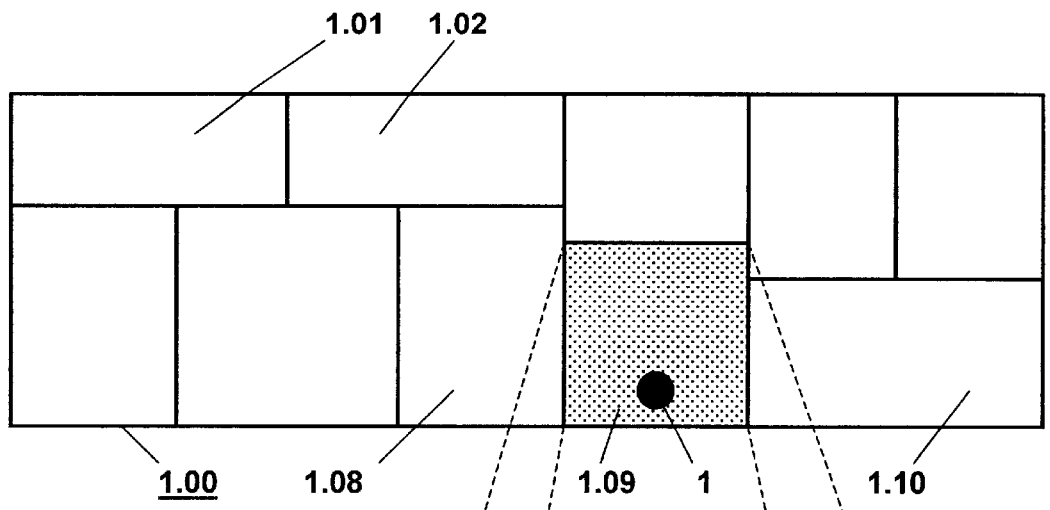
FIGS. 1a, b and c show an outline illustration of a physically hierarchically structured process plant.
Figure 1B:
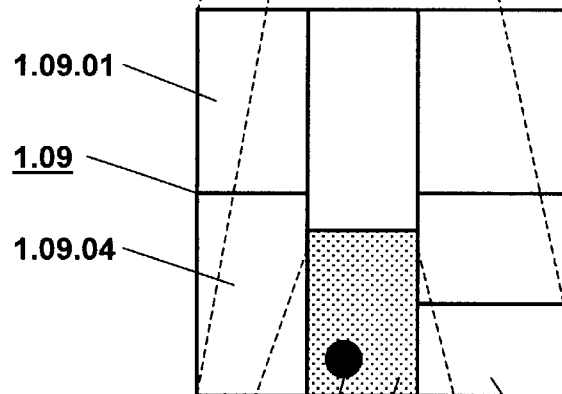
Figure 1C:
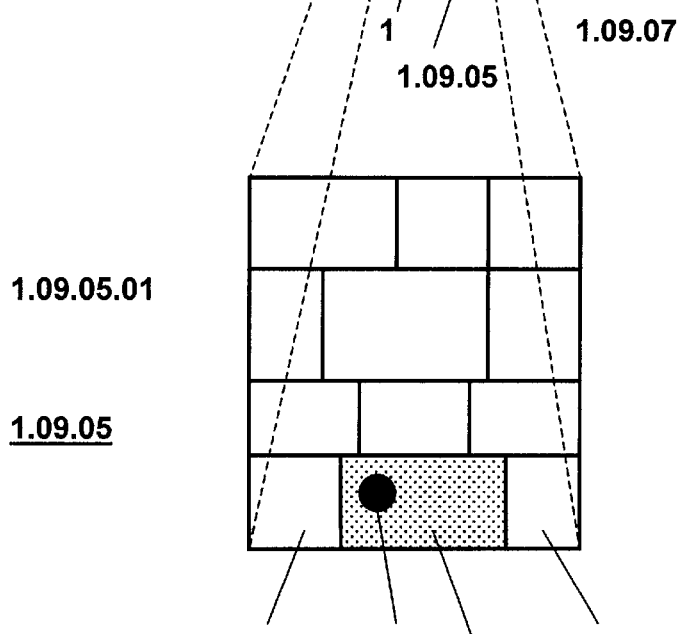

FIG. 1a shows a physically hierarchically structured process plant 1.00 in outlined form. The plant 1.00 is subdivided into plant parts 1.01 to 1.10 in a first structural level. A faulty field device 1 is shown in the plant part 1.09. The plant part 1.09, which is itself broken down into plant sections 1.09.01 to 1.09.07 in a second structural level, is shown enlarged, for this purpose, in FIG. 1b. In the second structural level, the faulty field device 1 is part of the plant section 1.09.05, which is itself broken down into plant segments 1.09.05.01 to 1.09.05.12 in a third structural level, as shown in FIG. 1c. The faulty field device 1 is part of the plant segment 1.09.05.11 in the fine structure at the third structural level.

The nature of the structuring and identification may in this case comply with DIN 6779, the KKS power station identification system, or some other suitable identification system which allows hierarchical structuring of the process plant 1.00.

Figure 2:
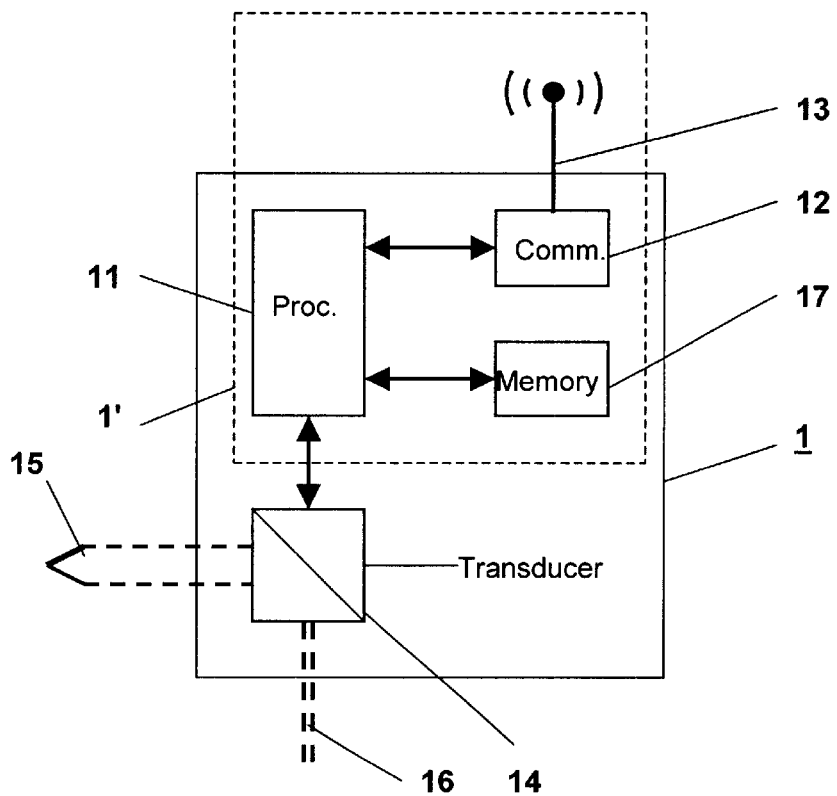
FIG. 2 shows an outline illustration of a field device.

As shown in FIG. 2, the field device 1 has an associated fixed-position device 1' comprising a processing unit 11, which is connected to a programmable non-volatile memory 17 and to a communication device 12 for wire-free communication.

Details relating to the position of the installation location of the field device 1 are stored in a nonvolatile memory 17 of the fixed-position device 1 such that they can be called up. During the installation of the field device 1, the details relating to the position of the installation location are entered in the non-volatile memory 17 in accordance with the preferred plant identification system.

In one preferred embodiment, the fixed-position device 1' is physically integrated in the field device 1. This prevents the fixed-position device 1', which has the position details, from accidentally being separated from the field device 1.

The field device 1 may be in the form of a sensor or actuator. If the field device 1 is a sensor, it has a transducer 14 for converting physical variables such as pressure, temperature, flow rate, concentration and the like to an electrical variable, and a measured value sensor 15 for the physical variable. If the field device 1 is an actuator, it has a transducer 14 for converting an electrical variable to a physical variable, and an actuator 16. Such transducers 14 are known per se, and are regularly equipped with means for identifying and signalling faults.

The field device 1 is connected to a control system via a communication network, which is not shown. The field device 1 can be identified uniquely within the communication network. Furthermore, the transducer 14 of the field device 1 is connected to the processing unit 11 in the fixed-position device 1' in order to transmit defect signals.

Figure 3:
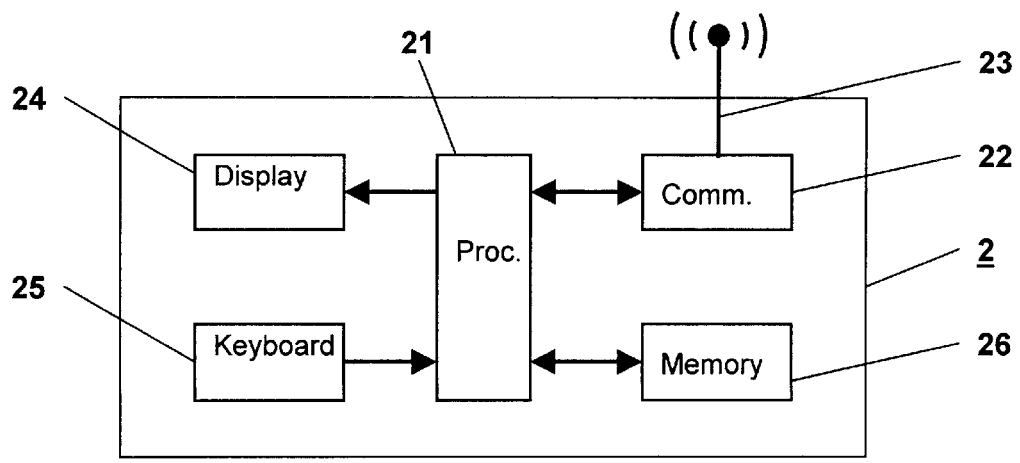
FIG. 3 shows an outline illustration of a mobile device.

Furthermore, a mobile device 2, which is illustrated in FIG. 3, is provided, which has a processing unit 21 to which a program memory 26, a keyboard 25, a display unit 24 and a communication device 22, which corresponds to the communication device 12 in the fixed-position device 1 and has an antenna 23, are connected for wire-free communication.

When a defect occurs in a field device 1, an alarm message is sent to the control system via the communication network. Furthermore, the communication device 12 for wire-free communication is activated via the processing unit 11. At the same time, the details (which are stored in the non-volatile memory 17 of the fixed-position device 1' such as they can be called up) relating to the position of the installation location of the field device 1 are called up in accordance with the specific plant identification, and are transmitted continuously.

The position details are received by the mobile device 2, and are visualized on its display unit 24. The servicing technician who is carrying the mobile device 2 is thus able, without any detailed knowledge of the plant, to go to and to find the faulty field device 1 in the process plant 1.00 specifically in the shortest possible time.

During fault-free operation of the field device 1, there is no signalling requirement and the fixed-position device 1' is switched to be inactive. This means that only position details relating to faulty field devices 1 are visualized on the display unit 24 of the mobile device 2.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system for determining the physical location of field devices in a process plant, in which each field device can be identified uniquely and is connected to a control system through a communication network, wherein said plant has a locally oriented hierarchical structure and a plant identification system based on said locally oriented hierarchical structure, said system comprising:

a fixed-position device associated with each field device, said fixed-position device comprising:

at least one processing unit, one communication device with an antenna for wire-free communication, and a non-volatile memory, said memory storing details relating to the position of the installation location of said field device such that said details can be called up, and a mobile device comprising:

at least one processing unit, a keyboard, a display unit and a communication device which corresponds to said communication device in said fixed-position device and has an antenna for wire-free communication, said display unit for visualizing the details which have been called up relating to the position of the installation location of the field device in the process plant.

2. The system of claim 1 wherein said fixed-position device is physically integrated in the field device.

3. The system of claim 1 wherein said fixed-position device is switched to be inactive during fault-free operation of the field device and is switched to be active when a defect is present, such that the details relating to the position of the installation location of the field device in the process plant are output via the communication device.

4. The system of claim 2 wherein said fixed-position device is switched to be inactive during fault-free operation of the field device and is switched to be active when a defect is present, such that the details relating to the position of the installation location of the field device in the process plant are output via the communication device.

* * * * *